United States Patent
Ja et al.

(10) Patent No.: US 7,995,619 B2
(45) Date of Patent: Aug. 9, 2011

(54) METHODS AND ARRANGEMENTS TO MODEL AN ASYNCHRONOUS INTERFACE

(75) Inventors: Yee Ja, Round Rock, TX (US); Bradley S. Nelson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 12/058,660

(22) Filed: Mar. 28, 2008

(65) Prior Publication Data

US 2008/0192645 A1 Aug. 14, 2008

Related U.S. Application Data

(63) Continuation of application No. 11/260,557, filed on Oct. 27, 2005.

(51) Int. Cl.
*H04J 3/06* (2006.01)
*G06F 3/00* (2006.01)

(52) U.S. Cl. ........... 370/503; 368/117; 710/58; 713/400

(58) Field of Classification Search .................. None
See application file for complete search history.

(56) References Cited

U.S. PATENT DOCUMENTS

| | | | |
|---|---|---|---|
| 5,553,276 A * | 9/1996 | Dean | 713/500 |
| 5,598,113 A * | 1/1997 | Jex et al. | 326/94 |
| 5,901,116 A * | 5/1999 | Quine | 368/117 |
| 6,876,678 B1 * | 4/2005 | Chow et al. | 370/538 |
| 2002/0013875 A1 * | 1/2002 | Dreps et al. | 710/305 |
| 2002/0144189 A1 * | 10/2002 | Chen | 714/43 |
| 2003/0046596 A1 * | 3/2003 | Floyd et al. | 713/400 |
| 2003/0101015 A1 * | 5/2003 | Douskey et al. | 702/120 |
| 2005/0069068 A1 * | 3/2005 | Gundurao et al. | 375/354 |
| 2005/0122810 A1 * | 6/2005 | Lee | 365/203 |
| 2005/0251773 A1 * | 11/2005 | Bair et al. | 716/6 |
| 2006/0233291 A1 * | 10/2006 | Garlepp et al. | 375/355 |
| 2008/0201599 A1 * | 8/2008 | Ferraiolo et al. | 713/401 |

OTHER PUBLICATIONS

Hoke, J.M., et al., "Self-timed Interface of the Input/Output Subsystem of the IBM eServer z900," IBM J. Res & Dev., vol. 46, No. 4/5, Jul./Sep. 2002, pp. 447-460.

Hoke, J.M., et al., "Self-timed Interface for S/390 I/O Subsystem Interconnection," IBM J. Res & Dev., vol. 43, No. 5/6, Sep./Nov. 1999, pp. 829-846.

Wang, David T., "A Brief Overview of High Frequency Processor-System Interconnects," http://www.realworldtech.com/includes/templates/articles.cfm?ArticleID=RWT011303183148mode=print, Updated: Jan. 13, 2003, pp. 1-8.

Greenstreet, Mark R., "Implementing a STARI Chip," Vancouver, B.C., V6T 1Z4 Canada, pp.-6, 1995.

* cited by examiner

*Primary Examiner* — Ricky Ngo
*Assistant Examiner* — Clemence Han
(74) *Attorney, Agent, or Firm* — Stephen J. Walder, Jr.; Matthew B. Talpis

(57) ABSTRACT

Methods and arrangements to model an asynchronous interface are disclosed. Embodiments include transformations, code, state machines or other logic to generate a skew pattern for a semi-static or time-constrained, asynchronous interface and employ the skew pattern in data transfers during a time interval in which the asynchronous interface. Embodiments may than alter the skew pattern in at the expiration of the time interval. In many embodiments, changes to the skew pattern may be substantially non-deterministic. In other embodiments, chances to the skew pattern may follow a heuristic or other dynamic or pre-determined pattern.

48 Claims, 5 Drawing Sheets

METHODS AND ARRANGEMENTS TO MODEL AN ASYNCHRONOUS INTERFACE

CROSS-REFERENCES TO RELATED APPLICATIONS

Pursuant to 35 USC §120, this continuation application claims priority to and benefit of U.S. patent application Ser. No. 11/260,557, entitled "METHODS AND ARRANGEMENTS TO MODEL AN ASYNCHRONOUS INTERFACE", filed on Oct. 27, 2005, the disclosure of which is incorporated herein in its entirety for all purposes.

FIELD

The present invention is in the field of clock circuits. More particularly, the present invention relates to methods and arrangements to model behavior of an asynchronous interface.

BACKGROUND

The push for high speed computing has led to the development of high speed, time-constrained, asynchronous links such as IBM's self-timed interfaces (STIs). In fact, the STI has been implemented in IBM's largest servers for several generations, providing successively improved input-output (I/O) subsystem bandwidth capacities. Time-constrained, asynchronous links are asynchronous data interfaces that transmit data over parallel bit lines via independent clock signals that are substantially synchronized at times. In particular, time-constrained, asynchronous interfaces, sometimes referred to as elastic or semi-static interfaces, may guarantee synchronous behavior over a specified time interval to facilitate data transfers.

For purposes of the data transfers, the synchronous nature of the elastic interfaces is limited to a time interval following the initial transmission and receipt of a test pattern of data. The test pattern data is examined to determine the timing relationship or skew pattern between bits received via different bit lines of the bus. Thereafter, for the extent of the time interval, data crossing the interface may be presumed to follow the same skew pattern. Receive logic identifies the skew pattern based upon the test pattern data and determines the timing required to synchronously capture subsequent data sent across the same interface.

Elastic interfaces make use of the knowledge that the change in phase between independently driven clocks will occur over time and that the rate of change is fairly constant. In particular, clocks for the elastic interface will stay reasonably in phase for the time interval and, thus, for that time interval, the clocks can be viewed as being effectively synchronous for data transfers. However, after the expiration of the time interval, the elastic interface is asynchronous again.

When testing circuit performance with regards to communication across an elastic interface, circuit designers must verify that the circuit can transfer data during the specified time intervals. Otherwise, the circuit will not function properly.

To verify the circuit's performance, designers utilize circuit simulators to simulate the circuit's performance prior to the investment of large amounts of capital to build the circuit. Ideally, circuit simulations accurately simulate every potentially problematic aspect of the circuit operation. The problem with current circuit simulators from the perspective of the elastic interface is that skew/jitter logic is employed to model asynchronous behavior. The skew/jitter logic is non-deterministic—i.e. the phase shift employed for a signal is always non-static. So skew/jitter logic cannot be used for elastic interfaces or other semi-static interfaces that require that the skew/jitter imposed remains static for a period of time.

The current solution for this problem is to employ a static skew pattern. This avoids the deficiency in circuit simulation of the elastic interface. The static skew pattern simulates one skew pattern of the elastic interface, however, this solution fails to simulate asynchronous behavior of the elastic interface at the expiration of the synchronous time interval, which is a potentially problematic aspect of the circuit operation.

SUMMARY OF THE INVENTION

The problems identified above are in large part addressed by methods and arrangements to model an asynchronous interface. One embodiment provides a method to model behavior of an asynchronous interface. The method may involve generating a first pattern of skews for a number of bit lines of the asynchronous interface and applying the first pattern of skews to bits associated with the number of bit lines during, a time interval. Furthermore, the method may apply a second pattern of skews to subsequent bits associated with the number of bit lines after the time interval.

Another embodiment provides a system to model behavior of an asynchronous interface. The system may comprise a delay applicator to apply skews to bits crossing the asynchronous interface via a number of bit lines. The system may also comprise a delay generator to generate a first pattern of the skews for the number of bit lines during a time interval and to generate a second pattern of skews for subsequent bits crossing the asynchronous interface via the number of bit lines after the time interval.

Another embodiment provides machine-accessible medium containing instructions to model behavior of an asynchronous interface, which when the instructions are executed by a machine, cause said machine to perform operations. The operations may involve generating a first pattern of skews for a number of bit lines of the asynchronous interface and applying the first pattern of skews to bits associated with the number of bit lines during a time interval. The operations may further involve applying a second pattern of skews to subsequent bits associated with the number of bit lines after the time interval.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to model an asynchronous interface are contemplated. Embodiments include transformations, code, state machines or other logic to generate a skew pattern for a semi-static or time-constrained, asynchronous interface and employ the skew pattern in data transfers during a time interval in which the asynchronous interface. Embodiments may then alter the skew pattern at the expiration of the time interval. In many embodiments, changes to the skew pattern may be substantially non-deterministic. In other embodiments, changes to the skew pattern may follow a heuristic or other dynamic or pre-determined pattern.

While specific embodiments will be described below with reference to particular circuit or logic configurations, those of skill in the art will realize that embodiments of the present invention may advantageously be implemented with other substantially equivalent con figurations.

Figure 1:
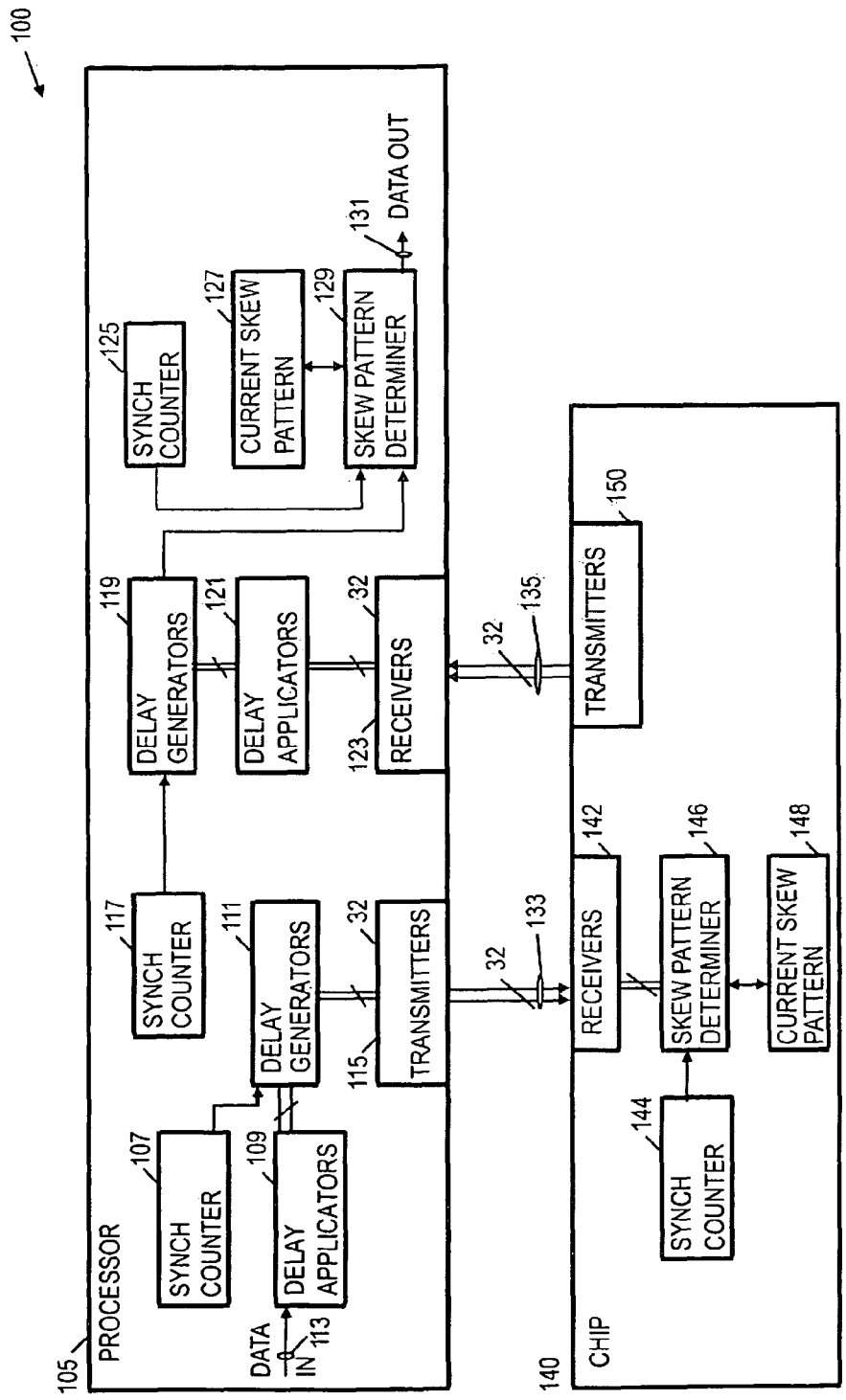
FIG. 1 depicts an embodiment of system level circuit simulation to simulate synchronous and asynchronous behavior of a 64-bit point-to-point bus between a processor and another chip.

Turning now to the drawings, FIG. 1 depicts an embodiment of system level circuit simulation 100 to simulate synchronous and asynchronous behavior of a 64-bit point-to-point bus, buses 133 and 135, between a processor 105 and another chip 140. For instance, processor 105 may model behavior of one of IBM's PowerPC 970 processors and chip 140 may model, for example, behavior of a memory controller hub designed to operate with processor 105.

Logic associated with transmission of data from processor 105 to chip 140 may include a synch counter 107, delay applicators 109, delay generators 111, and transmitters 115 to implement a skew pattern in data transmitted across 32-bit bus 133. In other embodiments, synch counter 107, delay applicators 109, and delay generators 111 may reside on the receiver-side of bus 133. In such embodiments, a skew pattern may be applied to the initial receive latch of receivers 142 rather than the initial send latch of transmitters 115. Furthermore, embodiments that implement a skew pattern on the send side may also model full propagation delays.

Synch counter 107 may count clock cycles of the time interval in which the clocks of bus 133 remain substantially in phase, referred to as a synch count, to facilitate generation of a new skew pattern upon expiration of the time interval. In some embodiments, the time interval may vary in accordance with a margin of error associated with the time interval. In further embodiments, the synch count for the time interval may be reset upon transmission of a test pattern of data.

While the present embodiment illustrates synch counter 107 for the send side of bus 133 and a synch counter 144 for the receive side of bus 133, other embodiments may utilize a single synch counter such as synch counter 107 for both sides of bus 133. Further embodiments may utilize synch counter 107 to indicate the end of a time interval for more than one bus such as bus 133 and bus 135. In one embodiment, other logic is implemented in place of synch counter 107 to generate a signal indicative of the end of a time interval for synchronized data transfer across an asynchronous bus like bus 133 and 135.

Delay applicators 109 may apply skews to data in 113 bits crossing the asynchronous interface via a number of bit lines of bus 133. In the present embodiment, several possible skews may be applied to each bit line so delay generators 111 may generate the skew pattern by selecting a signal from available signals for each bit line. In further embodiments, delay applicators 109 may apply skews to bits after selection of the skew pattern by delay generators 111. In such embodiments, for example, delay generators 111 may select skews for each bit line of bus 133 and delay applicators 109 may then apply the skew pattern to bits being transmitted across bus 133.

Delay generators 111 may generate a first pattern of skews for bit lines of bus 133 during a time interval. In many embodiments, delay generators 111 may generate an independent skew for each bit line of bus 133. The skew patterns may be generated by selecting skewed signals from a range of predetermined skewed signals available from delay applicators 109. The range may comprise a range of feasible skews for bus 133. For instance, delay generators 109 may generate 32 random select signals, one for each bit line of bus 133, to select from delays input from delay applicators 109. Then, upon receipt of an indication from synch counter 107 that the time interval is ending or has ended, delay generators 111 may generate new selection signals to modify the skew pattern for subsequent bits crossing bus 133 to chip 140.

Transmitters 115 may comprise a simulation of physical layer devices adapted to transmit bits across bus 133 to receivers 142. Similarly, receiver 142 may comprise a simulation of physical layer devices adapted to receive the bits from transmitters 115. Depending upon the parameters of the simulation, transmitters 115 and receivers 142 may simulate ideal or less ideal circuitry operation.

Synch counter 117, delay generators 119, and delay applicators 121 comprise logic to apply a skew pattern to bits on the receive side of bus 135. In other embodiments, chip 140 may comprise logic such as delay applicators 109 and delay generators 111 to apply the skew pattern to bits prior to transmitting the bits across bus 135.

In the present embodiment, transmitters 150 transmit data across bus 135 to receivers 123 without skews related to, e.g., differences in temperature and voltage between bit lines of the bus, differences in length of the bit lines, or the like. In further embodiments, one or more of these skews or other skews may be applied to the bits crossing bus 135 prior to transmission from chip 140.

Delay applicators 121 may receive the bits and add a number of different skews to each bit between the overall minimum and maximum latencies expected for the bit lines of buts 135. Applying skews between the minimum and maximum skews at delay applicators 121 advantageously avoids the necessity, in some embodiments, of separate logic for modeling a zero clock cycle skew.

Delay generators 119 may randomly select a skew pattern for the bits from those provided by delay applicators 121 based upon an indication from synch counter 117. The indication from synch counter 117 may be related to the transmission of test pattern data across bus 135 and/or the end of a substantially synchronous time interval for bus 135. Then delay generators 119 may forward the bits to a skew pattern determiner 129.

Synch counter 117 may perform a substantially similar function as synch counter 107 for bus 135. In some embodiments, synch counter 117 may comprise logic adapted to decrement a synch count from an initial number to zero and, upon reaching zero, transmit a signal to delay generators 119 to select a new skew pattern. In other embodiments, synch counter 117 may comprise part of other logic designed for a different and/or related purpose.

Synch counter 125 may generate a signal to indicate the end of a substantially synchronous time interval for data transfer across bus 135. Synch counter 125 may comprise logic to simulate differences potentially encountered between signals received at delay generators 119 and signals received at skew pattern determiner 129. In other embodiments, skew pattern generator 129 may receive signals to indicate the end of substantially synchronous time intervals for data transfer across bus 135 from synch counter 117.

Skew pattern determiner 129 may receive an indication from synch counter 125 to demark the end of a first time interval of substantially synchronous behavior. Skew pattern determiner 129 may then, in response to receipt of a new test pattern of bits, determine a new skew pattern for data transferred across bus 135 during a second time interval of substantially synchronous behavior. The new skew pattern may be stored in current skew pattern 127 and utilized to organize data received during the second time interval.

Skew pattern determiner 129 may then apply the current skew pattern for the bit lines during the second time interval of substantially synchronous behavior and transmit the data to other logic via data out 131. Current skew pattern 127 may comprise memory or logic to maintain the most recent valid skew pattern for the bits crossing bus 135.

Chip 140 may be a simulation of a companion chip for processor 105 such as a memory controller hub, a host bridge, a snoop controller, or the like. Synch counter 144, skew pattern determiner 146, and current skew pattern 148 may model receipt and interpretation of data received from transmitters 115 in a manner similar to that of synch counter 125, skew pattern determiner 129, and current skew pattern 127.

Figure 2:
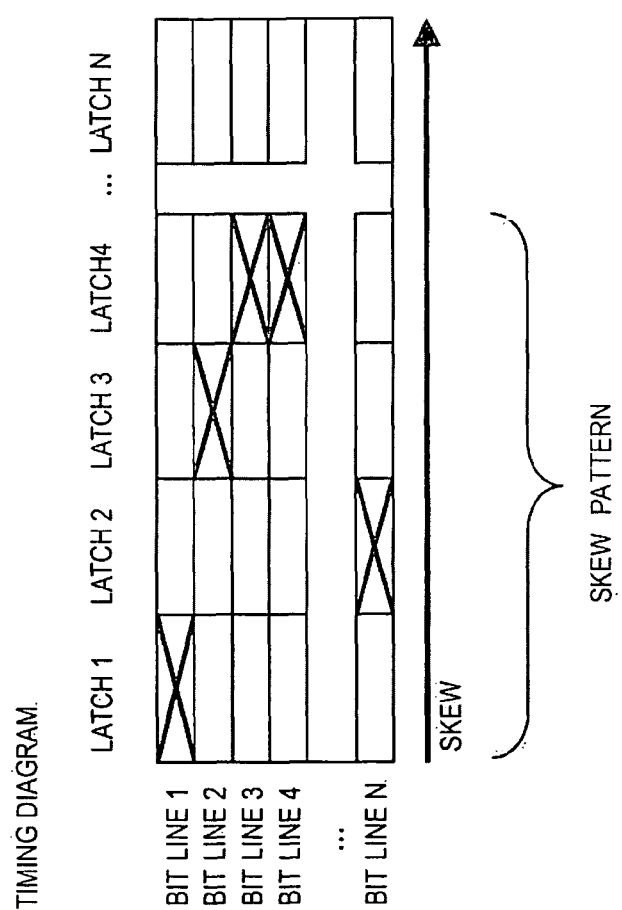
FIG. 2 depicts an example of a timing diagram for transmission and receipt of bits across an N-bit point-to-point bus such as the 64-bit point-to-point bus of FIG. 1.

FIG. 2 depicts an example of a timing diagram 200 for transmission and receipt of bits across a bus such as the 64-bit point-to-point bus of FIG. 1. The timing diagram 200 depicts increments in skew delay in relation to a series latches from latch 1 to latch N. The skew associated with latch 1 may be, for instance, a single clock cycle of delay for bit lines marked with an 'X' in the column of latch 1. In other embodiments, the skew associated with latch 1 may be a zero clock cycle delay to simulate no skew or a negative skew, depending upon the time reference associated with the latches. In further embodiments, latches may represent two or more clock cycles of delay.

In the present embodiment, latch 1 represents a zero skew and each successive latch, 2 through N, represents the addition of a single clock cycle of delay. Thus, latch 2 represents a single clock cycle of delay and latch N represents a clock delay of N−1 clock cycles. For example, the 'X' in the row of bit line 1 is under latch one to indicate a zero clock cycle delay for bits received via bit line 1 and the 'X' in the row of bit line N is in the latch 2 column to indicate that bits received via bit line N will have a single clock cycle skew. Similarly, an 'X' in the latch 3 column indicates a skew of two clock cycles for bits received via bit line 2 and each 'X' in the latch 4 column indicates skews of three clock cycles for bits received via bit lines 3 and 4.

The combination of the clock skews for the bus comprising bit lines 1 through N is an example of a skew pattern. The skew pattern may be determined by comparing, the skew of bits of test pattern data transmitted across the bus. For instance, the test pattern data on each bit line may propagate through a series of latches until all the test pattern data is received. Once the test pattern data is received, the relative progression of the bits of the test pattern data through the series of latches may indicate the skew pattern.

Figure 3:
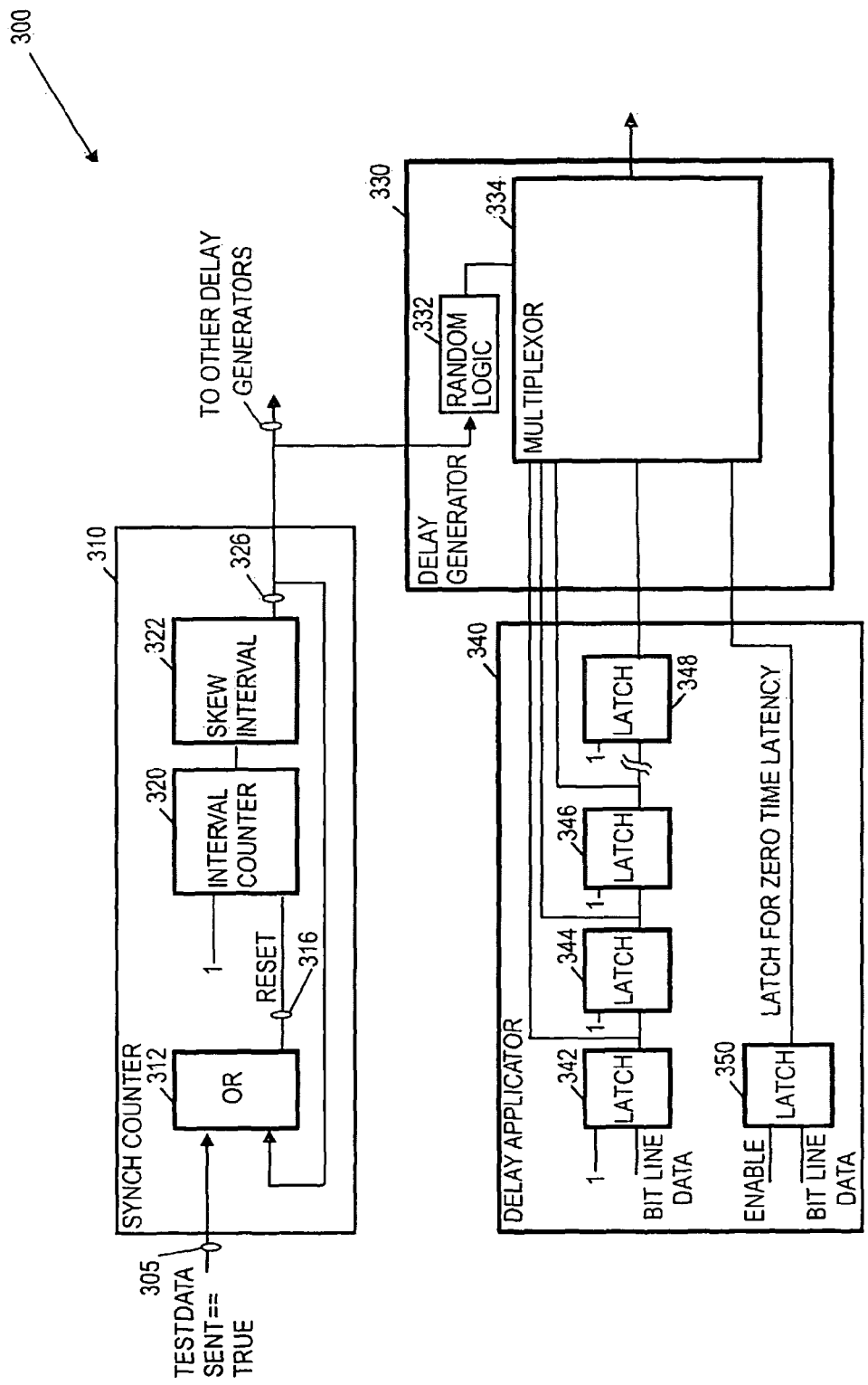
FIG. 3 depicts an embodiment of a circuit simulation for application of a skew to a bit line to simulate synchronous and asynchronous behavior of a time-constrained, asynchronous interface.

Turning now to FIG. 3, there is shown an embodiment of a circuit simulation 300 for application of a skew to a bit line to simulate synchronous and asynchronous behavior of a time-constrained, asynchronous interface. The circuit simulation 300 includes a synch counter 310, a delay generator 330, and a delay applicator 340 to model the behavior. For instance, synch counter 310 is adapted to count a number of cycles, a synch count, which may be the number of cycles that synchronous behavior is specified or guaranteed for the asynchronous interface. The synch count is reset when test pattern data is transmitted across the asynchronous interface by producing a reset signal 316. The reset signal 316 is produced in response to application of a logical one at an input 305, which is indicative of the test data being sent.

The logical one is applied to an input of 'OR' logic 312. The second input of 'OR' logic 312 is the output signal 326 of synch counter 310, which remains a logical zero until the end of the synch count. Interval counter 320 may decrement the synch count down to zero or count from zero to the synch count. In some embodiments, the synch count is fixed. In other embodiments, the synch count, which is counted by interval counter 320, may be changed periodically. The reset signal 316 restarts the synch Count.

Once interval counter 320 completes the synch count, a skew interval 322 receives a signal indicating that the time interval for substantially synchronous behavior of the asynchronous interface has expired. In response to the signal, skew interval 322 transmits a signal 326 to delay generator 330 and possibly to other delay generators for other bit lines associated with the same bus or another bus.

Delay generator 330 comprises random logic 332 and multiplexor 334. Random logic 332 may generate a substantially random selection signal for multiplexor 334. In some embodiments, the selection signal generated by random logic 332 may be selected from equally weighted selection signals. In other embodiments, the selection signals may be weighted differently.

The selection signal may comprise one or more bits and multiplexor 334 may select an input from delay applicator 340 based upon the selection signal. The selection of an input from delay applicator 340 in this embodiment selects a bit that is delayed by a skew. In many embodiments, each input from delay applicator 340 may comprise the bit delayed by a different skew and the skews may range, e.g., from a zero skew to a maximum skew for the corresponding bit line of the asynchronous bus. In further embodiments, a zero skew option may not be available so the skews may vary from a minimum skew to a maximum skew. In still other embodiments, the minimum skew available may be less than a zero skew or a negative skew, depending upon parameters of the simulation, time references selected for the latches, or evaluative tools for the logic.

Random logic 332 maintains the same signal at the input of multiplexor 334 until a signal is received from synch counter 310 to generate a subsequent selection signal. Then, the subsequent selection signal may be the same or different from the prior selection signal in some embodiment. As a result, delay generator 330 selects the same skew for subsequent bits until random logic 332 generates a new selection signal.

Delay applicator 340 may receive a bit of bit line data and apply a number of different delays to the bit. Each delay, which is within a selected range of skews for the bit line, is input into multiplexor 334. To illustrate the present embodiment, assume that latches 342 through 348 each add a one clock cycle delay to a bit received at the bit line data input of latch 342. In other words, the bit is propagated latch to latch toward latch N through the latches. Selection of the output of latch 342 via multiplexor 334 provides the bit with a one clock cycle skew. Similarly, the output of latch 344 provides a two cycle delay, the output of latch 346 provides a three cycle skew, and the output of latch 348 provides an N cycle skew. Latch 350, if enabled via the enable input, provides the bit line data with a zero cycle skew as an input to multiplexor 334.

Figure 4:
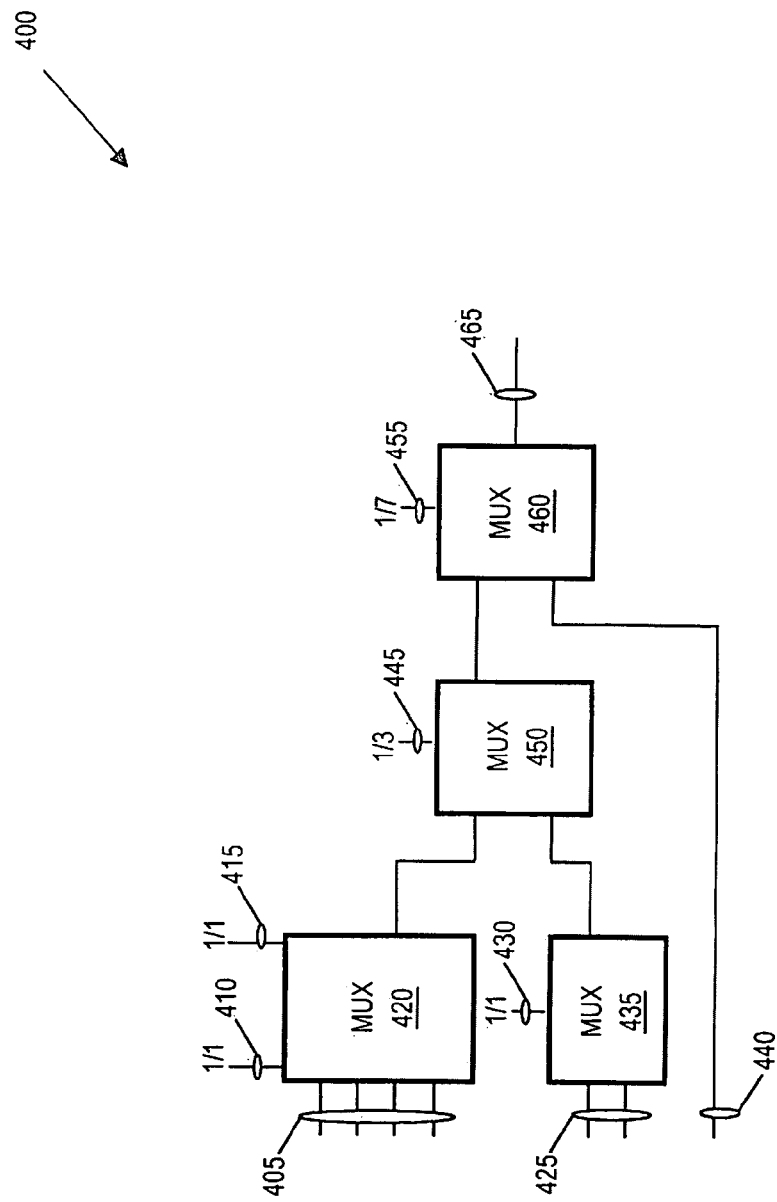
FIG. 4 depicts an embodiment of a staged multiplexor to equate the probabilities for selection of a skew from a set of seven different potential skews to model the behavior of a bit line of an elastic interface.

FIG. 4 illustrates an embodiment of a staged multiplexor 400 to equate the probabilities for selection of a skew from a set of seven different potential skews 405, 425, and 440 to model the behavior of a bit line of an elastic-interface. Staged multiplexor 400 or another staged multiplexor may be implemented in place of multiplexor 334 of FIG. 3 to handle a number of inputs received from delay applicator 340 of FIG. 3 that is not a power of two.

Multiplexor (MUX) 420 receives four inputs 405 from, e.g., a delay applicator and two selection signals 410 and 415 from, e.g., a random logic. The selection signals each have an equal chance "1/1" of being a logical one or a logical zero. "1/1" represents the weighting of a logical zero and a logical one.

Similarly, MUX 435 selects between two inputs 425. Selection signal 430 provides a 50% chance of being a logical zero and a 50% chance of being a logical one as indicated by "1/1". Then, the selected outputs of MUX 420 and MUX 435 are input into MUX 450. MUX 450 receives a selection signal 445 that has a one in three chance "1/3" of selecting a logical zero over a logical one and, as a result, provides equivalent probabilities of selecting each of the inputs 405 and 425.

After selecting from inputs 405 and 425, the selected input is applied to an input of MUX 460. The seventh possible input 440 is also applied to an input of MUX 460. MUX 460 then receives a selection signal 455 that provides a one in seven chance "1/7" of selecting the input 440. The selected input from the seven inputs is then sent to other logic via output 465.

Figure 5:
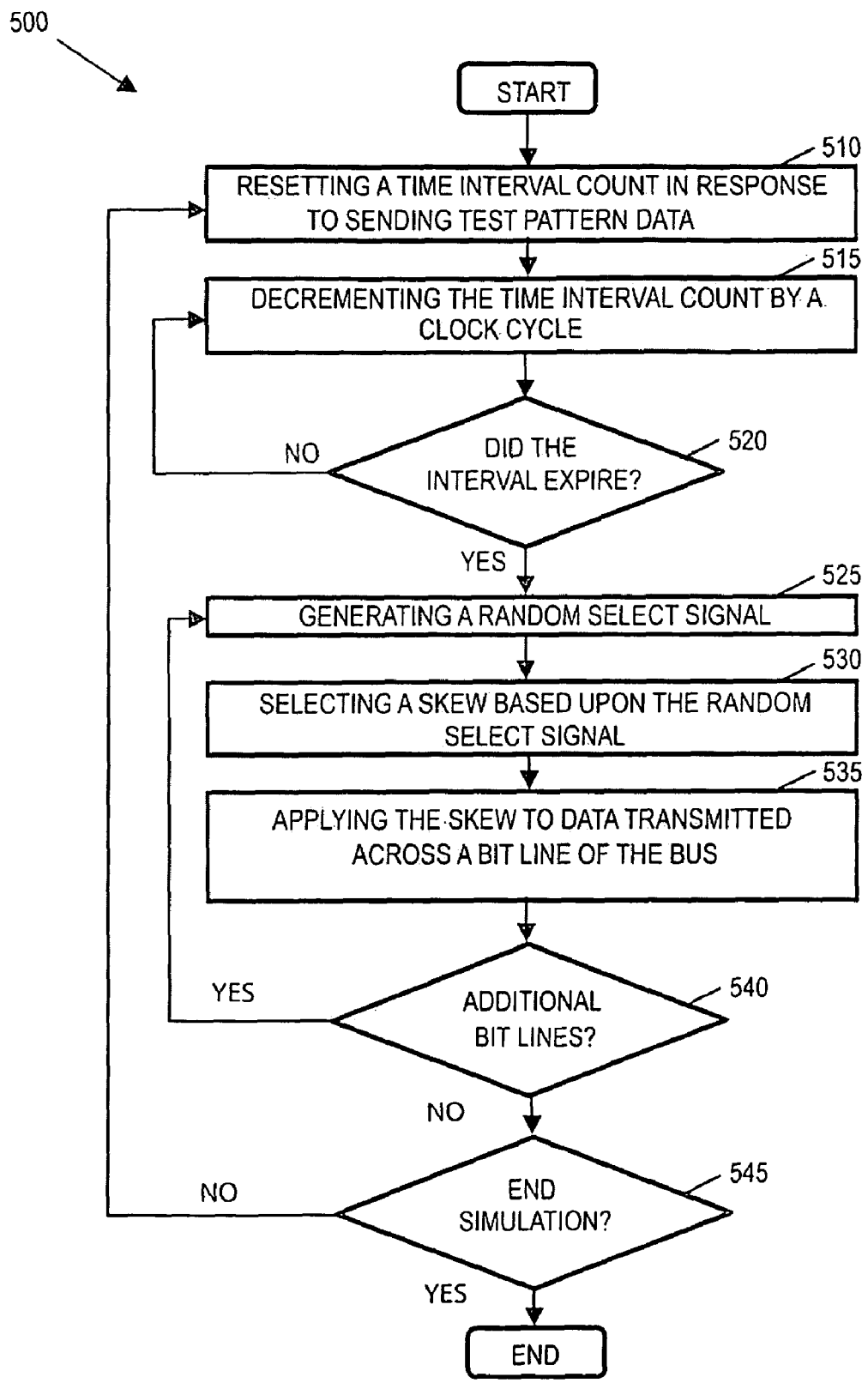
FIG. 5 depicts a flowchart of an embodiment to simulate synchronous and asynchronous behavior of bit lines of an asynchronous bus.

Referring now to FIG. 5, there is shown a flowchart of an embodiment to simulate synchronous and asynchronous behavior of bit lines of an asynchronous bus. Flow chart 500 begins with resetting a time interval count, or synch count, in response to sending test pattern data (element 510). For example, during initialization of a time interval of substantially synchronous data transfer on the asynchronous bus, test pattern data is transmitted across the bus to determine a skew pattern for data crossing the bus. As the test pattern data is transmitted across the bus, the time interval count down for substantially synchronous behavior is restarted.

A counter may decrement the time interval count each clock cycle (element 515) until the interval expires (element 520). Once the time interval count reaches zero, the counter signals logic to generate a random select signal (element 525), which is applied to a select input of, e.g., a multiplexor, a multi-stage multiplexor, or similar logic. The multiplexor may then select a skew for a bit line of the asynchronous bus based upon the random select signal (element 530). For example, the multiplexor may comprise several inputs for the bit and each input may add a different amount of delay or skew to transmission of the bit across the asynchronous bus. The random select signal may then facilitate selection of one of those skews in a substantially non-deterministic manner. In other embodiments, selection of one of those skews may follow a heuristic or other dynamic or pre-determined pattern. Then, when the time interval for substantially synchronous behavior expires, the multiplexor receives a new select signal to modify the skew pattern again in a substantially non-deterministic manner, advantageously modeling the behavior of the time-constrained, asynchronous bus.

If there are additional bit lines of the bus (element 540), a substantially non-deterministic skew may be selected for each by generating random select signals (element 525), selecting skews for each based upon the random select signals (element 530), and applying the skews to data crossing the bit lines of the bus (element 535). Furthermore, if the circuit simulation is to continue (element 545), each element of flowchart 500 from element 510 to element 540 may be repeated. Otherwise, the circuit simulation may end.

Another embodiment of the invention is implemented as a program product for implementing a circuit simulation such as circuit simulation 100 illustrated in FIG. 1. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods and arrangements to model behavior of an asynchronous interface. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to model behavior of an asynchronous interface, the method comprising:
   generating, by a delay generator, a first pattern of skews for a number of bit lines of the asynchronous interface;
   applying, by a delay applicator, the first pattern of skews to bits associated with the number of bit lines during a time interval;
   applying, by the delay applicator, a second pattern of skews to subsequent bits associated with the number of bit lines after the time interval;
   counting clock cycles of the time interval and resetting the time interval upon transmission of a test pattern of bits; and
   determining a skew pattern between the number of bit lines based upon comparison between bits of a test pattern and a pattern of received bits.

2. The method of claim 1, wherein generating the first pattern comprises generating a selection signal for a multiplexor logic to select a skew for at least one of the bit lines.

3. The method of claim 1, wherein applying the first pattern comprises applying the first pattern prior to transmission of data across the asynchronous interface.

4. The method of claim 1, wherein applying the first pattern comprises applying the first pattern upon receipt of data at a receiver from the asynchronous interface.

5. The method of claim 1, wherein applying the second pattern of skews comprises generating the second pattern of skews.

6. The method of claim 5, wherein generating the second pattern of skews comprises selecting skews for each of the number of bit lines in a non-deterministic manner.

7. A system to model behavior of an asynchronous interface, the system comprising:
   a delay applicator to apply skews to bits crossing the asynchronous interface via a number of bit lines; and
   a delay generator to generate a first pattern of the skews for the number of bit lines during a time interval and to generate a second pattern of skews for subsequent bits crossing the asynchronous interface via the number of bit lines after the time interval;
   a synch counter to count clock cycles of the time interval to indicate an end of the time interval and to restart the time interval upon transmission of test pattern data; and
   a skew pattern determiner to determine a skew pattern between the number of bit lines based upon comparison between bits of a test pattern and a pattern of received bits.

8. The system of claim 7, wherein the delay applicator comprises delay logic to apply the skews prior to transmission of the bits across the asynchronous interface.

9. The system of claim 7, wherein the delay applicator comprises delay logic to apply the skews after receipt of the bits from the bit lines.

10. The system of claim 9, wherein the delay generator couples with the synch counter to generate the second pattern of skews upon expiration of the time interval, wherein the second pattern of skews is non-deterministic.

11. The system of claim 7, wherein the delay generator comprises random logic to generate the selection signal for a multiplexor logic to select from the skews applied to the bits crossing the asynchronous interface for at least one of the bit lines.

12. The system of claim 11, wherein the delay generator comprises the multiplexor logic to select from the skews applied to the bits crossing the asynchronous interface based upon the selection signal, wherein a probability of selection of a skew from the skews is predetermined.

13. The system of claim 11, wherein the multiplexor logic is adapted to independently select a skew from the skews for each of the number of bit lines.

14. A machine-accessible storage medium containing instructions to model behavior of an asynchronous interface, which when the instructions are executed by a machine, cause said machine to perform operations, comprising:
   generating a first pattern of skews for a number of bit lines of the asynchronous interface;
   applying the first pattern of skews to bits associated with the number of bit lines during a time interval;
   applying a second pattern of skews to subsequent bits associated with the number of bit lines after the time interval; counting clock cycles of the time interval and resetting the time interval upon transmission of a test pattern of bits; and
   determining a skew pattern between the number of bit lines based upon comparison between bits of a test pattern and a pattern of received bits.

15. A method to model behavior of an asynchronous interface, the method comprising:
   generating, by a delay generator, a first pattern of skews for a number of bit lines of the asynchronous interface;
   applying, by a delay applicator, the first pattern of skews to bits associated with the number of bit lines during a time interval;
   applying, by the delay applicator, a second pattern of skews to subsequent bits associated with the number of bit lines after the time interval; and
   determining a skew pattern between the number of bit lines based upon comparison between bits of a test pattern and a pattern of received bits;
   wherein applying the first pattern of skews comprises applying, by delay logic of the delay applicator, the skews after receipt of the bits from the bit lines.

16. The method of claim 15, further comprising counting clock cycles of the time interval and resetting the time interval upon transmission of a test pattern of bits.

17. The method of claim 15, wherein generating the first pattern comprises generating the selection signal for a multiplexor logic to select a skew for at least one of the bit lines.

18. The method of claim 15, wherein applying the first pattern comprises applying the first pattern prior to transmission of data across the asynchronous interface.

19. The method of claim 15, wherein applying the first pattern comprises applying the first pattern upon receipt of data at a receiver from the asynchronous interface.

20. The method of claim 15, wherein applying the second pattern of skews comprises generating the second pattern of skews.

21. The method of claim 20, wherein generating the second pattern of skews comprises selecting skews for each of the number of bit lines in a non-deterministic manner.

22. A system to model behavior of an asynchronous interface, the system comprising:
- a delay applicator to apply skews to bits crossing the asynchronous interface via a number of bit lines, wherein the delay applicator comprises delay logic to apply the skews after receipt of the bits from the bit lines;
- a delay generator to generate a first pattern of the skews for the number of bit lines during a time interval and to generate a second pattern of skews for subsequent bits crossing the asynchronous interface via the number of bit lines after the time interval; and
- a skew pattern determiner to determine a skew pattern between the number of bit lines based upon comparison between bits of a test pattern and a pattern of received bits.

23. The system of claim 22, further comprising a synch counter to count clock cycles of the time interval to indicate an end of the time interval and to restart the time interval upon transmission of test pattern data.

24. The system of claim 22, wherein the delay applicator comprises delay logic to apply the skews prior to transmission of the bits across the asynchronous interface.

25. The system of claim 22, wherein the delay generator couples with the synch counter to generate the second pattern of skews upon expiration of the time interval, wherein the second pattern of skews is non-deterministic.

26. The system of claim 22, wherein the delay generator comprises random logic to generate a selection signal for a multiplexor logic to select from the skews applied to the bits crossing the asynchronous interface for at least one of the bit lines.

27. The system of claim 26, wherein the delay generator comprises the multiplexor logic to select from the skews applied to the bits crossing the asynchronous interface based upon the selection signal, wherein a probability of selection of a skew from the skews is predetermined.

28. The system of claim 26, wherein the multiplexor logic is adapted to independently select a skew from the skews for each of the number of bit lines.

29. A machine-accessible storage medium containing instructions to model behavior of an asynchronous interface, which when the instructions are executed by a machine, cause said machine to perform operations, comprising:
- generating a first pattern of skews for a number of bit lines of the asynchronous interface;
- applying the first pattern of skews to bits associated with the number of bit lines during a time interval;
- applying a second pattern of skews to subsequent bits associated with the number of bit lines after the time interval; and
- determining a skew pattern between the number of bit lines based upon comparison between bits of a test pattern and a pattern of received bits;
- wherein applying the first pattern of skews comprises applying the skews after receipt of the bits from the bit lines.

30. The machine-accessible storage medium of claim 29, wherein the operations further comprise counting clock cycles of the time interval and resetting the time interval upon transmission of a test pattern of bits.

31. A method to model behavior of an asynchronous interface, the method comprising:
- generating, by a delay generator, a first pattern of skews for a number of bit lines of the asynchronous interface;
- generating, by random logic of the delay generator, a selection signal for a multiplexor logic to select from the skews applied to the bits crossing the asynchronous interface for at least one of the bit lines;
- applying, by a delay applicator, the first pattern of skews to bits associated with the number of bit lines during a time interval; and
- applying, by the delay applicator, a second pattern of skews to subsequent bits associated with the number of bit lines after the time interval.

32. The method of claim 31, further comprising determining a skew pattern between the number of bit lines based upon comparison between bits of a test pattern and a pattern of received bits.

33. The method of claim 31, further comprising counting clock cycles of the time interval and resetting the time interval upon transmission of a test pattern of bits.

34. The method of claim 31, wherein generating the first pattern comprises generating a selection signal for a multiplexor logic to select a skew for at least one of the bit lines.

35. The method of claim 31, wherein applying the first pattern comprises applying the first pattern prior to transmission of data across the asynchronous interface.

36. The method of claim 31, wherein applying the first pattern comprises applying the first pattern upon receipt of data at a receiver from the asynchronous interface.

37. The method of claim 31, wherein applying the second pattern of skews comprises generating the second pattern of skews.

38. The method of claim 37, wherein generating the second pattern of skews comprises selecting skews for each of the number of bit lines in a non-deterministic manner.

39. A system to model behavior of an asynchronous interface, the system comprising:
- a delay applicator to apply skews to bits crossing the asynchronous interface via a number of bit lines; and
- a delay generator to generate a first pattern of the skews for the number of bit lines during a time interval and to generate a second pattern of skews for subsequent bits crossing the asynchronous interface via the number of bit lines after the time interval, wherein the delay generator comprises random logic to generate a selection signal for a multiplexor logic to select from the skews applied to the bits crossing the asynchronous interface for at least one of the bit lines.

40. The system of claim 39, further comprising a synch counter to count clock cycles of the time interval to indicate an end of the time interval and to restart the time interval upon transmission of test pattern data.

41. The system of claim 39, wherein the delay applicator comprises delay logic to apply the skews prior to transmission of the bits across the asynchronous interface.

42. The system of claim 39, wherein the delay applicator comprises delay logic to apply the skews after receipt of the bits from the bit lines.

43. The system of claim 42, wherein the delay generator couples with the synch counter to generate the second pattern of skews upon expiration of the time interval, wherein the second pattern of skews is non-deterministic.

44. The system of claim 39, wherein the delay generator comprises the multiplexor logic to select from the skews applied to the bits crossing the asynchronous interface based upon the selection signal, wherein a probability of selection of a skew from the skews is predetermined.

45. The system of claim 39, wherein the multiplexor logic is adapted to independently select a skew from the skews for each of the number of bit lines.

46. A machine-accessible storage medium containing instructions to model behavior of an asynchronous interface, which when the instructions are executed by a machine, cause said machine to perform operations, comprising:

generating a first pattern of skews for a number of bit lines of the asynchronous interface;

generating, by random logic of the delay generator, a selection signal for a multiplexor logic to select from the skews applied to the bits crossing the asynchronous interface for at least one of the bit lines;

applying the first pattern of skews to bits associated with the number of bit lines during a time interval; and applying a second pattern of skews to subsequent bits associated with the number of bit lines after the time interval.

47. The machine-accessible storage medium of claim 46, wherein the operations further comprise counting clock cycles of the time interval and resetting the time interval upon transmission of a test pattern of bits.

48. The machine-accessible storage medium of claim 46, wherein the operations further comprise determining a skew pattern between the number of bit lines based upon comparison between bits of a test pattern and a pattern of received bits.

* * * * *